United States Patent [19]

Isobe et al.

[11] 4,451,531

[45] May 29, 1984

[54] MAGNETIC RECORDING MEDIUM AND METHOD

[76] Inventors: Yukihiro Isobe, 3204, Irisawa, Usada-machi, Minamisaku-gun, Nagano-ken; Kazushi Tanaka, 438-1, Otsu, Komoro-shi, Nagano-ken; Masaharu Nishimatsu, 2494-16, Mikageshinden, Komoro-shi, Nagano-ken; Osamu Shinoura, 3272, Nakagomi, Saku-shi, Nagano-ken; Yuichi Kubota, 197-46, Mukaida, Hei, Komoro-shi, Nagano-ken, all of Japan

[21] Appl. No.: 384,063

[22] Filed: Jun. 1, 1982

[30] Foreign Application Priority Data

Jun. 5, 1981 [JP] Japan .................. 56-85689

[51] Int. Cl.$^3$ .............................. B32B 5/16
[52] U.S. Cl. ...................... 428/329; 427/36; 427/44; 427/128; 427/130; 428/325; 428/328; 428/337; 428/694; 428/698; 428/900
[58] Field of Search .................. 427/127–132, 427/48, 44, 54.1; 428/900, 694; 252/62.54

[56] References Cited

U.S. PATENT DOCUMENTS

| | | | |
|---|---|---|---|
| 3,293,066 | 12/1966 | Haines | 428/900 |
| 3,617,378 | 11/1971 | Beck | 117/226 |
| 3,881,046 | 4/1975 | Akashi et al. | 428/483 |
| 4,260,466 | 4/1981 | Shirahata et al. | 427/44 |
| 4,309,482 | 1/1982 | Suzuki et al. | 428/695 |
| 4,335,183 | 6/1982 | Hosaka | 428/336 |
| 4,343,831 | 8/1982 | Tsuji et al. | 427/44 |

*Primary Examiner*—Bernard D. Pianalto
*Attorney, Agent, or Firm*—Wyatt, Gerber, Shoup, Scobey & Badie

[57] ABSTRACT

The invention provides a novel magnetic recording tape comprising a film base, a magnetic coating layer on one surface and a backing layer on the other surface, the backing layer containing an abrasive powder having a hardness of at least 4 in the Mohs scale, such as silicon carbide and the like, dispersed in a binder matrix formed by curing a radiation-sensitive polymer by irradiating with a high energy radiation, such as electron beams accelerated at a voltage of 100 to 750 kilovolts. Coating of the film base with a coating composition to form the backing layer is performed on the surface of the film base having been provided with the magnetic coating layer on the other surface and the radiation-curing of the backing layer is performed prior to winding the tape into a roll to give a specified tensile modulus so that the magnetic recording tape is freed from the problem of the phenomenon of dropout owing to the absence of any particulate material adhering to the tape surface as is sometimes unavoidable in the conventional manufacturing process. The product tape is also quite free from scratch formation by virtue of the presence of the abrasive powder in the backing layer also contributing to the decrease of dropout.

15 Claims, No Drawings

MAGNETIC RECORDING MEDIUM AND METHOD

BACKGROUND OF THE INVENTION

The present invention relates to a magnetic recording medium such as a magnetic recording tape used in audio instruments, video instruments and computers. More particularly, the invention relates to a magnetic recording medium having an improved backing layer on the surface of the film base reverse to the surface provided with the magnetic coating layer, which is imparted with highly improved resistance against scratch formation and also free from the problem of dropout not only in the beginning stage of the serviceable life but also after a long-run use of the recording tape.

Needless to say, magnetic recording tapes are widely used as a means for information recording in the field of electronics including audio and video technologies as well as computer technologies. Along with the progress of the information processing technology by use of magnetic recording tapes, the amount of information recorded on such magnetic recording tapes is rapidly increasing year by year so that it is an urgent requirement for magnetic recording tapes that the recording density of the information on the tape should be as high as possible.

Usually, short-wavelength recording is undertaken to ensure high-density recording but this way of recording is subject to the problem of dropout, which is a phenomenon of infidelity in the readout of the information recorded on the magnetic recording tape by skipping pulses indispensable for the reproduction of the information with high fidelity.

Such a phenomenon of dropout is caused mainly by the instantaneous or momentary increase of the spacing loss between the magnetic recording tape and the magnetic head of the playback instrument. The spacing loss therebetween is expressed by the formula $54.6 \, d/\lambda$ [dB], in which d is the distance between the tape and the magnetic head and $\lambda$ is the wavelength of recording. As is understood from this formula, the spacing loss is much larger in the short-wavelength recording for high density recording than in the long-wavelength recording so that, in the former case, even an extremely small foreign body adhering to the surface of the tape may cause remarkable increase in the spacing loss resulting in the phenomenon of dropout.

As is explained in the above, the phenomenon of dropout takes place when a tiny foreign body produced in the manufacturing and/or in the course of use of the magnetic recording tape is present on the surface of the tape to increase the spacing between the tape and the magnetic head. Such undesirable foreign bodies on the tape surface are formed by the magnetic particles having fallen off the surface of the magnetic coating layer on the tape due to the deterioration of the coating layer by the repeatedly applied stress in the frequent recording and playing of the recording tape or by the particles of dust or debris of the film base necessarily shaved off during travelling of the tape to be electrostatically attracted on to the surface of the film base and then transferred to the surface of the magnetic coating layer.

In order to prevent the above described drawbacks, in particular, by the latter mechanism, several methods have been proposed including a method of reducing electrostatic charge on the surface by providing an antistatic coating on the surface of the tape reverse to the magnetic coating layer with an antistatic agent or with a coating composition prepared by dispersing an electroconductive powder such as carbon black or graphite powder in an organic binder and a method of providing a protective backing layer to the reverse side surface with a coating composition prepared by dispersing a finely divided amorphous silicon dioxide filler or other reinforcing filler in an organic binder to decrease shave-off of the film base of the travelling magnetic recording tape.

The above described methods are indeed effective to some extent to prevent gradual increase of the dropout in the repeated use of a magnetic recording tape. The effect of these methods so far obtained is, however, far from satisfactory and it is eagerly desired to develop an improved magnetic recording tape with complete suppression of dropout.

In particular, it has been unexpectedly noted that the method of providing a protective backing layer is not so effective in decreasing the phenomenon of dropout in the early stage of the serviceable life of a magnetic recording tape before so many numbers of repeated travelling, i.e. recording and playing, of the tape. It is usual that the coating of the backing layer on the film base is performed after the magnetic coating layer has been provided followed by calendering since, when the order is reversed, i.e. when the backing layer is first provided on one of the surfaces of the film base and then the magnetic coating layer is formed on the other surface followed by calendering, no complete smoothing effect of the surface of the magnetic coating layer can be obtained by the calendering because the ruggedness in the backing layer is transferred or copied to the magnetic coating layer in the calendering.

The binder material for the backing layer is usually a thermosetting resin because it is an essential requirement that the binder material should be strong enough not to cause increase of the phenomenon of dropout even after so many numbers of repeated travelling of the tape regardless of the type of the filler incorporated therein which may be an electroconductive powder such as carbon black and graphite powder or other inorganic particulate materials. In the case of using a thermosetting resin as the binder material of the backing layer, the coating composition for the backing layer is first applied to the surface of the film base followed by winding of the thus coated tape into a roll and then the thermosetting resin is subjected to the curing treatment as on the rolled tape. Needless to say, the backing layer containing the thermosetting resin as formed by the application of a coating composition to the film base has no sufficient mechanical strengths before curing of the resin so that, when the tape is wound up into a roll bringing the backing layer and the magnetic coating layer into direct contact with each other, the particles of the carbon black, graphite powder or other inorganic filler impregnating the backing layer may sometimes be transferred to the surface of the magnetic coating layer in contact with the backing layer before curing. The detailed investigations undertaken by the inventors for the mechanism of the phenomenon of dropout led to a discovery that the phenomena of dropout in playing of the tape and fill-up of the surface of the magnetic head are sometimes attributable to the filler particles transferred from the uncured backing layer to the magnetic coating layer. This is the very reason for the disadvantage that the phenomenon of dropout is not decreased so much as expected at the initial stage of the life of a new magnetic recording tape by providing a backing layer to the tape even though the backing layer is considerably effective in suppressing the increase of the dropout after repeated travelling of the tape. In other words, the phenomenon of dropout takes place considerably even at the very beginning stage of the use of a new magnetic recording tape since the tape as prepared per se is not free from certain particulate materials adhering to the surface of the magnetic coating layer as transferred from the backing layer. Presumably, the effect of the backing layer to suppress the increase of the dropout is exhibited only after a number of repeated travelling of the tape with the reinforcing and antistatic effects thereof. The situation may be similar when a thermoplastic resin is used as the binder resin for the backing layer.

SUMMARY OF THE INVENTION

It is therefore an object of the present invention to provide a magnetic recording medium or a magnetic recording tape with which the phenomenon of the dropout can be minimized throughout the life of the tape, i.e. not only after repeated travelling of the tape but also in the very beginning stage of the use of a new tape by virtue of the absence of any foreign bodies on the tape surface at the delivery of the product to the user.

Another object of the invention is to provide a method for the preparation of a magnetic recording tape in which the above described disadvantages and problems in the prior art methods have been removed to eliminate any foreign bodies transferred from the backing layer to the magnetic coating layer in the course of the formation of the backing layer.

A further object of the invention is to provide a method for the preparation of a magnetic recording tape outstandingly insusceptible to the formation of scratches even by a great number of repeated travelling for recording and playing also contributing to the decrease of dropout.

The magnetic recording medium or tape of the present invention comprises a film base, a magnetic coating layer provided on one surface of the film base and a backing layer provided on the other surface of the film base, the backing layer being formed by applying a coating composition comprising a radiation-sensitive curable resin as a binder and an abrasive powder having a hardness of at least 4 in the Mohs scale as dispersed in the binder and subjecting the coating composition on the surface of the film base to curing by irradiation with a high energy radiation so as to impart the cured backing layer with a tensile modulus at 100% elongation in the range from 25 to 300 kg/cm$^2$.

The method of the present invention accordingly comprises the steps of coating a surface of a film base, having been provided with a magnetic coating layer on the other surface, with a coating composition containing an abrasive powder having a hardness of at least 4 in the Mohs scale dispersed in the matrix of a radiation-sensitive curable polymer as a binder to form a backing layer and then subjecting the backing layer, prior to winding of the tape into a roll, to the irradiation with a high energy radiation to effect curing of the radiation-sensitive curable polymer to such an extent that the thus cured backing layer is imparted with a modulus at 100% elongation in the range from 25 to 300 kg/cm$^2$.

The irradiation with a high energy radiation above mentioned may be carried out perferably in an inert atmosphere with electron beams accelerated at a voltage of 100 to 750 kilovolts and the radiation dose absorbed by the backing layer is preferably in the range from 0.5 to 20 Mrad.

The abrasive powder is preferably selected from the group consisting of silicon carbide, alumina, chromium oxide, crystalline silicon dioxides, garnet, zinc oxide, titanium dioxide, α-iron(III) oxide, boron nitride and zircon.

DETAILED DESCRIPTION OF THE PREFERRED EMBODIMENTS

As is described above, the essential features of the present invention are in the use of a radiation-sensitive curable polymer as the binder for the backing layer of a magnetic recording tape and an abrasive powder having a specified hardness as dispersed in the binder resin. That is, the binder polymer is blended with an abrasive powder such as silicon carbide, alumina and the like to form a coating composition and a backing layer is formed on the surface of the film base, reverse to the surface on which the magnetic coating layer has been provided, by coating with the above prepared coating composition which is irradiated with a high energy radiation to effect curing of the radiation-sensitive curable polymer by the formation of three-dimensional crosslinks to give a mechanically strong coating film of the backing layer. The tape is wound into a roll only after completion of the radiation-induced curing of the backing layer so that the phenomenon of transfer of the particulate material from the uncured backing layer to the magnetic coating layer never takes place because these layers come into direct contact with each other by winding only after the binder polymer has been fully cured.

It has also been found that the stiffness of the backing layer is of some significance to the satisfactory performance of the magnetic recording tape. When the stiffness of the backing layer is improper, scratches are formed on the magnetic coating layer by winding the tape into a roll in the course of manufacturing or use thereof since the magnetic coating layer is heavily rubbed by the backing layer in direct contact therewith consequently increasing the phenomenon of dropout as the most serious drawback in a magnetic recording tape. In the present invention, the tensile modulus of the backing layer at 100% elongation, which serves as a measure of the stiffness, can be controlled by formulating an abrasive powder having a specified hardness in the coating composition for forming the backing layer.

In this connection, it has been established that the tensile modulus of the backing layer at 100% elongation should be at least 25 kg/cm$^2$ so that the formation of scratches on the magnetic coating layer can substantially completely be prevented and the adverse effects caused by tight winding of the tape into a roll can be avoided effectively. When the modulus is smaller than 25 kg/cm$^2$, the stiffness of the tape may be insufficient and cause some inconvenience in handling thereof and also scratches cannot be prevented. When the modulus is in excess of 300 kg/cm$^2$, on the other hand, the surface smoothness of the magnetic coating layer is influenced even by an extremely small ruggedness of the backing layer due to the excessively high stiffness of the latter. Thus, control of the modulus of the backing layer at 100% elongation is essential by the formulation of an abrasive powder in the coating composition in order to improve the antiabrasive resistance of the backing layer and to more reliably prevent wearing and shaving of the backing layer.

As is understood from the above description, the present invention is characteristic in the radiation-induced curing of the backing layer provided by coating with a coating composition formulated with a radiation-sensitive curable resin as a binder and an abrasive powder dispersed therein and the modulus of the thus radiation-cured backing layer at 100% elongation in the range from 25 to 300 kg/cm$^2$. These characteristics are essential to effectively suppress the phenomenon of dropout not only in the beginning stage of the life of a magnetic recording tape but also after repeated travelling of the tape for recording and playing.

The radiation-sensitive curable polymer used as a binder in the present invention is defined as a polymer having at least two ethylenically unsaturated bonds in a polymeric molecule and capable of being crosslinked or cured by the mechanism of free radical when irradiated with a high energy radiation. As is well known, polymers may be classified into two classes of radiation-degradable ones and radiation-crosslinkable ones and the polymers belonging to the latter class are suitable as the radiation-sensitive curable binder resin in the present invention including, for example, polyethylenes, polypropylenes, polystyrenes, polymers of acrylic acid esters, polyacrylamides, polyvinyl chlorides, polyesters, polyvinyl pyrrolidone rubbers, polyvinyl alcohols, polyacroleins and the like.

Although the above named polymers may be used as such as the radiation-sensitive curable binder polymer for the backing layer, a more preferable way from the standpoint of curing velocity is the modification of a thermoplastic resin to impart increased sensitivity to radiation. A particular example of the modification to impart increased radiation sensitivity is the introduction of the groups or structures capable of being crosslinked or cured by polymerization when irradiated with a high energy radiation such as the acrylic double bonds as in acrylic and methacrylic acids and esters thereof, allylic double bonds as in diallyl phthalate, double bonds as in maleic acid and derivatives thereof and the like having radical-polymerizability. Other types of ethylenic unsaturation may of course be suitable if provided with crosslinkability by the irradiation with a high energy radiation.

Following are several examples of the thermoplastic resins capable of being modified into radiation-sensitive curable resins.

(I) Copolymers of vinyl chloride including copolymers of vinyl chloride, vinyl acetate and vinyl alcohol, copolymers of vinyl chloride and vinyl alcohol, copolymers of vinyl chloride, vinyl alcohol and vinyl propionate, copolymers of vinyl chloride, vinyl acetate and maleic acid and copolymers of vinyl chloride, vinyl acetate and OH-terminated branched-chain alkyl groups. Copolymers of these types are available, for example, from Union Carbide Corp. by the tradenames of VAGH, VROH, VYNC, VYEGX, VERR and the like.

These copolymers can be modified to be imparted with radiation sensitivity by introducing double bonds derived from an acrylic monomer, maleic acid or an allylic monomer by the method to be described hereinbelow.

(II) Saturated polyester resins including those obtained by the esterification of a saturated polybasic acid such as phthalic acid, isophthalic acid, terephthalic acid, succinic acid, adipic acid, sebacic acid and the like with one or more of polyhydric alcohols such as ehtyleneglycol, diethyleneglycol, glycerin, trimethylolpropane, 1,2-propyleneglycol, 1,3-butanediol, dipropyleneglycol, 1,4-butanediol, 1,6-hexanediol, pentaerithritol sorbitol, neopenteneglycol, 1,4-cyclohexane dimethanol and the like as well as those resins obtained by modifying the above polyester resins with sulfo groups SO$_3$H and converted to the sodium salt thereof available by the tradename of Byron 53S.

These polyester resins may be modified to be imparted with radiation sensitivity by the method to be described hereinbelow.

(III) Unsaturated polyester resins having radiation-curable double bonds in the molecular chain of the polyester compound including those resins obtained by the partial substitution of maleic acid for the polybasic acid in the saturated polyester resins in (II) above formulated with a polybasic acid and a polyhydric alcohol to form ester linkages as well as the prepolymers and oligomers thereof.

The polybasic acids and the plyhydric alcohols for the polyester may be the same as in the formulation for the saturated polyester resins given in (II) above and the radiation-curable double bonds may be introduced also by use of fumaric acid instead of maleic acid above mentioned.

The radiation-curable unsaturated polyester resins are prepared in a conventional procedure of condensation reaction in which a mixture of one or more of the polybasic acids including maleic or fumaric acid and one or more of the polyhydric alcohols is heated at 180° to 200° C. under an inert atmosphere of nitrogen gas in the presence of a catalyst to effect the dehydration reaction or dealcoholation reaction followed by temperature elevation to 240° to 280° C. under a reduced pressure of 0.5 to 1 mmHg. The amount of the unsaturated polybasic acid such as maleic and fumaric acids is in the range from 1 to 40% by moles or, preferably, from 10 to 30% by moles in the polybasic acids from the standpoint of obtaining adequate crosslinkability in the manufacturing or radiation-curability.

(IV) Polyvinyl alcohol-based resins including polyvinyl alcohols, polyvinyl butyral resins, acetal resins and formal resins as well as the copolymeric resins composed of these monomeric components. These resins may also be modified to be imparted with radiation-sensitivity at the hydroxy groups therein by the method to be described hereinbelow.

(V) Epoxy resins and phenoxy resins obtained, for example, by the reaction of bisphenol A and epichlorohydrin or methyl epichlorohydrin sold by Shell Chemical Co. with the tradenames of Epikotes 152, 154, 828, 1001, 1004 and 1007, by Dow Chemical Co. with the tradenames of DEN 431, DER 732, DER 511 and DER 331 and by Dai-Nippon Ink Chemical Co. with the tradenames of Epiclons 400 and 800 as well as the highly polymerized resins of the above named epoxy compounds such as the phenoxy resins sold by Union Carbide Corp. with the tradenames of PKHA, PKHC and PKHH and the copolymers of brominated bisphenol A and epichlorohydrin sold by Dai-Nippon Ink Chemical Co. with the tradenames of Epiclons 145, 152, 153 and 1120.

These resins may also be modified to be imparted with radiation-sensitivity by utilizing the epoxy groups contained therein.

(VI) Cellulose derivatives having various molecular weights are also useful as the thermoplastic resin component including, in particular, nitrocelluloses, cellulose acetate butyrates, ethylcelluloses, butylcelluloses, acetylcelluloses and the like as the preferable examples. These cellulose derivatives may also be modified to be imparted with radiation-sensitivity by utilizing the hydroxy groups contained therein.

In addition to the above named thermoplastic resins, several other polymers are also effective including polyfunctional polyester resins, polyether-ester resins, polyvinyl pyrrolidone resins and derivatives thereof such as copolymers of an olefin and vinyl pyrrolidone, polyamide resins, polyimide resins, phenolic resins, spiroacetal resins and acrylic resins of which at least one of the monomeric constituents is an acrylic or methacrylic ester having a hydroxy group.

The toughness of the coating film for the backing layer formed of the coating composition formulated with the above named thermoplastic resins modified to be radiation-sensitive may be further enhanced by blending a thermoplastic elastomer or a prepolymer with the thermoplastic resin. Further enhanced effect is obtained when these elastomers or prepolymers are also modified to be radiation-sensitive in a similar manner to the modification of the thermoplastic resins. Detailed descriptions will be given later of the elastomers and prepolymers to be combined with the above described thermoplastic resins modified to be imparted with radiation-sensitivity.

Alternatively, suitable polymeric material as the binder in the present invention includes a polymer blend of an elastomer modified to be radiation-sensitive and a thermoplastic resin.

According to this method, a possibility is obtained of the rapid curing of a non-solvent type resin, i.e. a resin not diluted with a solvent, so that such a resin may be used as the binder in the backing layer.

The coating composition used for forming the backing layer on the magnetic recording tape according to the invention is prepared by blending and uniformly dispersing an abrasive powder having a hardness of at least 4 in the Mohs scale in the above described radiation-sensitive curable polymer as a binder. Suitable blending machine is not particularly limitative including conventional ballmills as well as other types of blending machines such as sand-grind mills, roller mills, high-speed impeller dispersers, homogenizers, ultrasonic dispersers and the like.

Various kinds of abrasive powders available on the market are suitable for use in the invention. Several of the examples of the abrasive powders having a hardness of at least 4 in the Mohs scale and their hardness values (in brackets) are: silicon carbide (9 to 10); alumina (9); chromium oxide (8); crystalline silicon dioxide, e.g. quartz (7); garnet (6.5 to 7.5); zinc oxide (4.5); titanium dioxide (6); $\alpha$-iron(III) oxide (5.5 to 6.5); boron nitride (9 to 10); and zircon (7.5). These abrasive powders can be used either individually or as a combination of two kinds or more according to need. These abrasive powders preferably should have a particle diameter not exceeding 4 $\mu$m.

Further, the abrasive powder may be combined with other non-magnetic inorganic and organic fillers such as talc, kaolin, calcium sulfate, calcium carbonate, fluorocarbon resin, fluorinated graphite, molybdenum disulfide, graphite, carbon black and the like.

The amount of the abrasive powder to be formulated in the coating composition is determined depending on the hardness and particle size distribution. Usually it is in the range from 5 to 350 parts by weight per 100 parts by weight of the binder polymer. When an inorganic or organic filler is used in combination with the abrasive powder, the amount of the filler is usually in the range from 10 to 300 parts by weight per 100 parts by weight of the binder depending on the kind of the filler. Too much of the filler in the coating composition are undesirable due to the brittleness of the cured backing layer formed therewith resulting in the increase of dropout on the contrary. When an abrasive powder and a filler are used in combination, in particular, the total amount of them should be determined carefully in order to avoid brittleness of the backing layer. The coating composition may be diluted by adding a suitable organic solvent, if necessary, to facilitate application on to the surface of the film base.

The thus prepared coating composition is applied to the surface of the film base having been provided with the magnetic coating layer on the other surface in a conventional manner to give a desired thickness of the layer followed by evaporation of the solvent to dryness. The thickness of the backing layer is preferably in the range from 1 to 5 $\mu$m as dried.

The next step is the irradiation of the backing layer formed of the coating composition by use of a high energy radiation to effect curing of the coating composition. The type of the high energy radiation is not particularly limitative including electron beams accelerated in an electron accelerator, gamma rays from cobalt-60, beta rays from strontium-90, X-rays from an X-ray generator and the like. From the standpoint of easiness in the control of the absorbed radiation dose, assemblage in the line of the coating process and shielding of the ionizing radiations, advantages are obtained by using electron beams accelerated in an electron accelerator as the high energy radiation source.

The characteristics of the radiation should be determined so as to obtain effective curing of the backing layer. For example, the accelerating voltage of the electron beams in the electron accelerator is in the range from 100 to 750 kilovolts or, preferably, from 150 to 300 kilovolts when the penetrability of the electron beams is taken into account. The radiation dose absorbed in the backing layer is controlled in the range from 0.5 to 20 Mrad. Such conditions of the irradiation for curing of the backing layer are readily obtained by use of a low-dose type electron accelerator such as the machine sold by Energy Science Co., U.S.A., under the name of Electrocurtain System. This machine is particularly advantageous in the easiness of the construction of the processing line for tape coating with the machine built therein as well as from the standpoint of radiation shielding of the secondary X-rays within the accelerator.

Conventional electron accelerators such as van de Graaff accelerators widely used in the radiation technology may of course be used. In view of the extremely small thickness of the coating of the backing layer, the curing reaction may be undertaken with ultraviolet light whereby the desired performance of the backing layer can be exhibited sufficiently.

It is important that the irradiation of the backing layer with the high energy radiation should be performed in an atmosphere of an inert gas such as nitrogen, carbon dioxide, argon, helium and the like. Oxygen should be excluded from the atmosphere for the irradiation since, when the irradiation is performed, for example, in air, the crosslinking reaction is strongly inhibited in the curing of the binder resin due to the disadvantageous influence of the ozone and the like active species formed by the irradiation of oxygen on the free radicals in the polymer to contribute to the crosslinking reaction. Accordingly, the concentration of oxygen in the atmosphere for the irradiation with the high energy radiation should not exceed 5% by volume when the atmosphere is kept inert with nitrogen, neon, carbon dioxide and the like.

When the curing of the backing layer has been completed in the above described manner, the magnetic recording tape is wound into a roll and sent to the subsequent steps of processing.

The magnetic recording tapes to be provided with the backing layer according to the invention include audio tapes, video tapes, computer tapes, endless tapes and the like. In particular, the present invention is very advantageous when applied to the video tapes and computer tapes of which the elimination of the phenomenon of dropout is one of the most important performance factors.

Following is the exemplifying description of the elastomers and the prepolymers to be modified and imparted with radiation-sensitivity or to be combined with the radiation-sensitive curable resins given before.

(I) Polyurethane elastomers as well as prepolymers and telomers thereof

Polyurethane elastomers are particularly useful when high abrasion resistance and strong adhesion to polyethylene terephthalate films are desired.

The urethane compounds, i.e. polyurethane elastomers, prepolymers and telomers, include the polycondensation products of an isocyanate compound exemplified by various kinds of polyvalent isocyanates, such as 2,4-toluene diisocyanate, 2,6-toluene diisocyanate, 1,3-xylene diisocyanate, 1,4-xylene diisocyanate, 1,5-naphthalene diisocyanate, 1,3-phenylene diisocyanate, 1,4-phenylene diisocyanate, 3,3'-dimethyl-4,4'-diphenylmethane diisocyanate, 4,4'-diphenylmethane diisocyanate, 3,3'-dimethylbiphenylene diisocyante, 4,4'-biphenylene diisocyanate, hexamethylene diisocyanate, isophorone diisocyanate, dicyclohexylmethane diisocyanate, Desmodur L, Desmodur N and the like, with one or more of linear saturated polyesters, such as the polycondensation products of a polyhydric alcohol, e.g. ethyleneglycol, glycerin, diethyleneglycol, trimethylolpropane, 1,4-butanediol, 1,6-hexanediol, pentaerithritol, sorbitol, neopentylglycol, 1,4-cyclohexane dimethanol and the like and a polybasic carboxylic acid, e.g. phthalic acid, isophthalic acid, terephthalic acid, maleic acid, succinic acid, adipic acid, sebacic acid and the like, linear saturated polyethers, such as polyethylene glycol, polypropylene glycol, polytetraethylene glycol and the like, and other kinds of polyesters, such as caprolactam, esters of hydroxy-containing acrylic acids, esters of hydroxy-containing methacrylic acids and the like.

These urethane compounds may be combined as such with the thermoplastic resin modified to be radiation-sensitive. A more advantageous way is, however, that these urethane elastomers are also modified to be radiation-sensitive before they are combined with the thermoplastic resin. Such a modification can be advantageously performed by utilizing the isocyanate groups or hydroxy groups at the molecular chain ends of the polyurethane elastomer which may be reacted with a monomer having acrylic or allylic unsaturation.

(II) Copolymeric elastomers of acrylonitrile and butadiene

The copolymeric prepolymers having hydroxy groups at the molecular chain ends sold by Sinclair Petrochemicals, Inc. with a tradename of Poly BD Liquid Resin, the elastomers sold by Nippon Zeon Co. with a tradename of Hycar 1432J and the like copolymers of acrylonitrile and butadiene are useful as the elastomeric component since they are capable of being crosslinked or polymerized with formation of free radicals from the double bonds in the butadiene constituent when irradiated with a high energy radiation.

(III) Polybutadiene elastomers

Low molecular weight prepolymers having hydroxy groups at the molecular chain ends such as Poly BD Liquid Resin R-15 sold by Sinclair Petrochemicals, Inc. are particularly suitable in respect of the compatibility with the thermoplastic resin. Further advantage is obtained with the above mentioned prepolymers, such as R-15, as a binder when the polymer is modified by the addition reaction of acrylic double bonds with the hydroxy groups at the molecular chain ends to enhance the radiation sensitivity.

Cyclized polybutadienes, such as CBR-M901 manufactured by Japan Synthetic Rubber Co. also exhibit excellent performance when combined with a thermoplastic resin. Cyclized polybutadienes are particularly advantageous as a binder by virtue of the high efficiency in the radiation-induced crosslinking polymerization with the free radicals formed from the unsaturated linkages inherently possessed by the polybutadiene.

In addition to the above described elastomers, several other types of elastomers may be advantageously used such as the copolymers of styrene and butadiene, chlorinated rubbers, acrylic rubbers, isoprene rubbers and cyclized products thereof, such as CIR 701 manufactured by Japan Synthetic Rubber Co., internally plasticized saturated linear polyesters, such as Byron #300 manufactured by Toyo Spinning Co., and the like as the thermoplastic elastomer or prepolymer to be combined with the thermoplastic resin when they are modified to be radiation-sensitive by the treatment described below.

In the following, the magnetic recording media of the invention are described in further detail by way of examples, which are preceded by the description of the preparation of several radiation-sensitive binder materials.

Preparation 1. Synthesis of an acrylic-modified radiation-sensitive copolymeric resin of vinyl chloride, vinyl acetate and vinyl alcohol Into a four-necked flask of 5-liter capacity were introduced 750 g of a vinyl chloride-vinyl acetate copolymeric resin (Vinylite VAGH manufactured by Union Carbide Corp.), 1250 g of toluene and 500 g of cyclohexanone and the mixture was heated to dissolve the resin in the solvent mixture. While keeping the reaction mixture at 80° C., 61.4 g of 2-hydroxyethyl methacrylate adduct of tolylene diisocyanate prepared in the manner as described hereinbelow, 0.012 g of tin octoate and 0.012 g of hydroquinone were added to the reaction mixture and the reaction was continued at 80° C. under an atmosphere of nitrogen until the conversion of the NCO groups had reached 90% or more. After completion of the reaction, the reaction mixture was allowed to cool and diluted by adding 1250 g of methylethylketone.

Preparation of the adduct of 2-hydroxyethyl methacrylate (2HEMA) and tolylene diisocyanate (TDI): into 348 g of TDI taken in a four-necked flask of 1-liter capacity and heated at 80° C. under a nitrogen stream were added dropwise 260 g of 2HEMA containing 0.07 g of tin octoate and 0.05 g of hydroquinone while the temperature of the reaction mixture was controlled in the range of 80° to 85° C. by outwardly cooling the flask. After completion of the dropwise addition of 2HEMA, the reaction mixture was further agitated at 80° C. for additional 3 hours to complete the reaction followed by cooling to give the 2HEMA adduct of TDI in the form of a white paste.

Preparation 2. Synthesis of a radiation-sensitive acrylic-modified polyvinyl butyral resin A mixture in a four-necked flask composed of 100 parts by weight of a polyvinyl butyral resin (BM-S manufactured by Sekisui Chemical Co.), 191.2 parts by weight of toluene and 71.4 parts by weight of cyclohexanone was heated to dissolve the resin in the solvent mixture and, after the temperature of the mixture had reached 80° C., 7.4 parts by weight of the 2HEMA adduct of TDI prepared as described above, 0.015 part by weight of tin octoate and 0.015 part by weight of hydroquinone were added thereto and the reaction was performed by agitating the reaction mixture at 80° C. under a nitrogen stream until the conversion of the NCO groups had reached 90% or more. After completion of the reaction, the reaction mixture was allowed to cool and diluted by adding methylethylketone.

Preparation 3. Synthesis of an acrylic-modified radiation-sensitive saturated polyester resin A solution formed by dissolving 100 parts by weight of a saturated polyester resin (Byron RV-200 manufactured by Toyo Spinning Co.) in a solvent mixture of 116 parts by weight of toluene and 116 parts by weight of methylethylketone was heated to 80° C. and then admixed with 3.55 parts by weight of the 2HEMA adduct of TDI prepared as described above, 0.007 part by weight of tin octoate and 0.007 part by weight of hydroquinone and the mixture was heated at 80° C. under a nitrogen stream to effect the reaction until the conversion of the NCO groups had reached 90% or more.

Preparation 4. Synthesis of an acrylic-modified radiation-sensitive epoxy resin

A solution formed by dissolving 400 parts by weight of an epoxy resin (Epikote 1007 manufactured by Shell Chemical Co.) in a solvent mixture of 50 parts by weight of toluene and 50 parts by weight of methylethylketone with heating was admixed with 0.006 part by weight of N,N-dimethylbenzylamine and 0.003 part by weight of hydroquinone followed by heating up to 80° C. Thereupon, 69 parts by weight of acrylic acid were added dropwise into the reaction mixture to effect the reaction until the acid value of the mixture had dropped to 5 or below.

Preparation 5. Synthesis of an acrylic-modified radiation-sensitive polyurethane elastomer Into a reaction vessel were introduced 250 parts by weight of a urethane prepolymer derived from diphenylmethane diisocyanate (MDI) and having isocyanate terminal groups (Nipolan 4040 manufactured by Nippon Polyurethane Co.), 32.5 parts by weight of 2-hydroxyethyl methacrylate, 0.07 part by weight of hydroquinone and 0.009 part by weight of tin octoate and the mixture was uniformized by heating at 80° C. Thereafter, 43.5 parts by weight of tolylene diisocyanate were added dropwise thereinto while the temperature of the reaction mixture was kept at 80° to 90° C. with outer cooling and the reaction was performed at 80° C. until the conversion of the NCO groups had reached 90% or more.

Preparation 6. Synthesis of an acrylic-modified radiation-sensitive polyether having urethane-modified terminal groups Into a reaction vessel were introduced 250 parts by weight of a polyether (PTG-500 manufactured by Nippon Polyurethane Co.), 32.5 parts by weight of 2-hydroxyethyl methacrylate, 0.007 part by weight of hydroquinone and 0.009 part by weight of tin octoate and the mixture was uniformized by heating at 80° C. Thereafter, 43.5 parts by weight of tolylene diisocyanate were added dropwise thereinto while the temperature of the reaction mixture was kept at 80° to 90° C. with outer cooling and the reaction was performed at 80° C. until the conversion of the NCO groups had reached 95% or more.

Preparation 7. Synthesis of an acrylic-modified radiation-sensitive polybutadiene elastomer Into a reaction vessel were introduced 250 parts by weight of a hydroxy-terminated low molecular weight polybutadiene (Poly BD Liquid Resin R-15 manufactured by Sinclair Petrochemicals, Inc.), 32.5 parts by weight of 2-hydroxyethyl methacrylate, 0.007 part by weight of hydroquinone and 0.009 part by weight of tin octoate and the mixture was uniformized by heating at 80° C. Thereafter, 43.5 parts by weight of tolylene diisocyanate were added dropwise thereinto while the temperature of the reaction mixture was kept at 80° to 90° C. with outer cooling and the reaction was performed at 80° C. until the conversion of the NCO groups had reached 95% or more.

EXAMPLE 1

Nine coating compositions 1-1 to 1-9 were prepared each by blending for 5 hours in a ballmill a mixture composed of 30 parts by weight of an acrylic-modified polyester resin prepared in Preparation 3 above and 200 parts by weight of a 1:1 by volume mixture of methylisobutylketone and toluene without or with addition of a varied amount of a powder of quartz having an average particle diameter of about 2 μm as an abrasive powder. The amounts of the abrasive powder were; 2, 5, 10, 25, 50, 100, 300 and 400 parts by weight per 100 parts by weight of the binder in the coating compositions 1-2 to 1-9, respectively, while the coating composition 1-1 contained no abrasive powder.

A polyester film base having been provided with a magnetic coating layer on a surface was coated on the other surface with one of the above prepared coating compositions 1-1 to 1-9 in a coating thickness of about 3

μm as dried followed by drying and irradiation of the coating layer in an atmosphere of nitrogen with electron beams accelerated in an electron accelerator of the Electrocurtain type at an accelerating voltage of 150 kilovolts. The intensity of the electron irradiation was 10 mA of the beam current and the radiation dose absorbed in the backing layer was controlled at 10 megarads. The magnetic recording tape thus provided with the radiation-cured backing layer was wound into a roll and sliced to give rolled video tapes of each a half inch width.

The video tapes were played on a VHS tape playing deck to examine the output variation and the dropout. The tapes obtained with the coating compositions 1-4 to 1-8 gave quite satisfactory results without noticeable increase in the dropout even after 100 times of repeated playing.

Then each of the video tapes was subjected to the test of abrasiveness in the following manner. Thus, the tape of 20 cm long was hung on a well-polished brass rod of 9 mm diameter fixedly supported in a horizontal disposition with the backing layer in contact with the surface of the brass rod and with each of the dangling ends pulled down with a 200 g weight attached thereto and the tape was moved up and down repeatedly with the surface of the brass rod being rubbed by the surface of the backing layer of the tape sliding thereon. After 100 times of the repeated reciprocative movement of the tape, the surface of the brass rod was visually examined to find the condition of scratches formed by rubbing with the tape. The results were evaluated in five grades of 5, 4, 3, 2 and 1, the grade 5 being for the lightest condition of the scratches and the grade 1 being for the heaviest condition of the scratches, and are given in the table below. When the grade was 5 or 4, the tape was quite satisfactory for practical use.

TABLE

| Coating Composition | 1-1 | 1-2 | 1-3 | 1-4 | 1-5 | 1-6 | 1-7 | 1-8 | 1-9 |
|---|---|---|---|---|---|---|---|---|---|
| Abrasive powder, parts by weight | 0 | 2 | 5 | 10 | 25 | 50 | 100 | 300 | 400 |
| Condition of scratches | 5 | 5 | 5 | 5 | 5 | 5 | 5 | 4 | 2 |

The results shown in the table clearly indicate that too much amounts of the abrasive powder, such as in the formulation of 1-9, are undesirable due to the remarkably heavy scratches while, on the other hand, absence (1-1) or a smaller amount (1-2) of the abrasive powder than the lower limit of the preferred range is also disadvantageous due to the formation of scratches on the surface of the backing layer of the tape as was noted by the visual examination of the tape after the rubbing test. It was concluded that very satisfactory magnetic recording tapes are obtained in respect of the scratch formation by providing a backing layer with a coating composition formulated with from 5 to 300 parts by weight of the quart abrasive per 100 parts by weight of the binder resin. The tapes with these formulations of the coating compositions were also satisfactory in respect of the remarkably decreased phenomenon of dropout after a long-run use of the tape. Meanwhile, the values of the tensile modulus of the backing layers at 100% elongation were all within the range from 25 to 300 kg/cm$^2$ for the formulations 1-2 to 1-9 of the coating compositions while the value obtained with the coating composition 1-1 was substantially smaller than 25 kg/cm$^2$.

EXAMPLE 2

A video tape was prepared by providing a backing layer in the same manner as in Example 1 with a coating composition obtained by uniformly blending 50 parts by weight of carbon black, 20 parts by weight of an alumina abrasive having an average particle diameter of about 0.5 μm (a product by Fujimi Abrasive Co.), 30 parts by weight of an acrylic-modified vinyl chloride-vinyl acetate-vinyl alcohol copolymer prepared in Preparation 1 above and 60 parts by weight of an acrylic-modified polyurethane elastomer prepared in Preparation 5 above in 300 parts by weight of a 1:1 by volume mixture of methyl isobutyl ketone and toluene. The rubbing test undertaken with this tape in the same manner as in Example 1 indicated that the tape was highly resistant against scratch formation graded in 5 and also satisfactory in respect of dropout without increase even after 100 times of repeated playing on the VHS video deck. The tensile modulus of the backing layer of this tape at 100% elongation was 220 kg/cm$^2$.

EXAMPLE 3

A video tape was prepared by providing a backing layer in the same manner as in Example 1 with a coating composition obtained by uniformly blending 50 parts by weight of a silicon carbide abrasive having an average particle diameter of about 2 μm (a product by Fujimi Abrasive Co.), 50 parts by weight of an acrylic-modified polyurethane elastomer prepared in Preparation 5 above and 50 parts by weight of a vinyl chloride-vinyl acetate-vinyl alcohol copolymer VAGH (a product by Union Carbide Corp.) in 400 parts by weight of a 1:1 by volume mixture of methylethylketone and toluene. The rubbing test undertaken with this tape in the same manner as in Example 1 indicated that the tape was highly resistant against scratch formation graded in 5 and also satisfactory in respect of dropout without increase even after 100 times of repeated playing on the VHS video deck. The tensile modulus of the backing layer at 100% elongation was 180 kg/cm$^2$.

EXAMPLE 4

A video tape was prepared in the same manner as in Example 1 by providing a backing layer with a coating composition obtained by uniformly blending 50 parts by weight of titanium dioxide having an average particle diameter of about 2 μm, 40 parts by weight of an acrylic-modified vinyl chloride-vinyl acetate-vinyl alcohol copolymer prepared in Preparation 1 above and 30 parts by weight of an acrylic modified polyurethane elastomer prepared in Preparation 5 above in 300 parts by weight of a 1:1 by volume mixture of methyl isobutyl ketone and toluene. The rubbing test undertaken with this video tape in the same manner as in Example 1 indicated that the tape was highly resistant against scratch formation graded in 5 and also satisfactory in respect of dropout without increase even after 100 times of repeated playing on the VHS video deck. The tensile modulus of the backing layer at 100% elongation was 40 kg/cm².

What is claimed is:

1. A magnetic recording medium which comprises a film base, a magnetic coating layer provided on a surface of the film base and a backing layer provided on the other surface of the film base having a tensile modulus at 100% elongation from 25 to 300 kg/cm² and containing an abrasive powder having a hardness of at least 4 in the Mohs scale dispersed in a matrix of a radiation-sensitive polymeric binder cured by the irradiation with a high energy radiation, the amount of abrasive powder being from 5 to 350 parts by weight per 100 parts of polymeric binder.

2. The magnetic recording medium as claimed in claim 1 wherein the abrasive powder is selected from the group consisting of silicon carbide, alumina, chromium oxide, crystalline silicon dioxide, garnet, zinc oxide, titanium dioxide, α-iron(III) oxide, boron nitride and zircon.

3. The magnetic recording medium as claimed in claim 1 wherein the radiation-sensitive polymeric binder is a thermoplastic resin modified to be radiation-sensitive or a blend of a thermoplastic resin modified to be radiation-sensitive and a thermoplastic elastomer or a prepolymer thereof.

4. The magnetic recording medium as claimed in claim 3 wherein the thermoplastic elastomer or a prepolymer thereof is modified to be radiation-sensitive.

5. The magnetic recording medium as claimed in claim 1 wherein the radiation-sensitive polymeric binder is a blend of a thermoplastic resin and a thermoplastic elastomer or a prepolymer thereof modified to be radiation-sensitive.

6. The magnetic recording medium as claimed in claim 1 wherein the baking layer has a thickness in the range from 1 to 5 μm.

7. The magnetic recording medium as claimed in claim 1 wherein the abrasive powder has a particle diameter not exceeding 4 μm.

8. A method for the preparation of a magnetic recording medium comprising a film base, a backing layer provided on a surface of the film base and a magnetic coating layer provided on the other surface of the film base which comprises the steps of (a) coating a surface of the film base having been provided with a magnetic coating layer on the other surface with a coating composition comprising a radiation-sensitive polymeric binder and an abrasive powder having a hardness of at least 4 in the Mohs scale dispersed in the polymeric binder to form a coating layer the amount of abrasive powder being from 5 to 350 parts of weight per 100 parts of polymeric binder, and (b) irradiating the coating layer for the backing layer with a high energy radiation to cure the radiation-sensitive polymeric binder to such an extent that the resultant backing layer has a tensile modulus at 100% elongation from 25 to 300 kg/cm².

9. The method as claimed in claim 8 wherein the abrasive powder is selected from the group consisting of silicon carbide, alumina, chromium oxide, crystalline silicon dioxide, garnet, zinc oxide, titanium dioxide, α-iron(III) oxide, boron nitride and zircon.

10. The method as claimed in claim 8 wherein the irradiation with the high energy radiation is carried out with electron beams accelerated in an electron accelerator.

11. The method as claimed in claim 10 wherein the electron beams are accelerated in the electron accelerator at an accelerating voltage in the range from 100 to 750 kilovolts.

12. The method as claimed in claim 10 wherein the irradiation with electron beams is carried out to such an extent that the radiation dose absorbed in the coating layer for the backing layer is in the range from 0.5 to 20 megarads.

13. The method as claimed in claim 8 wherein the step (b) is performed prior to winding the magnetic recording medium into a roll.

14. The method as claimed in claim 8 wherein the radiation-sensitive polymeric binder is a thermoplastic resin modified to be radiation-sensitive or a blend of a thermoplastic resin modified to be radiation-sensitive and a thermoplastic elastomer or a prepolymer thereof.

15. The method as claimed in claim 14 wherein the thermoplastic elastomer or a prepolymer thereof is modified to be radiation-sensitive.

* * * * *

UNITED STATES PATENT AND TRADEMARK OFFICE
CERTIFICATE OF CORRECTION

PATENT NO. : 4,451,531
DATED : May 29, 1984
INVENTOR(S) : ISOBE ET AL.

It is certified that error appears in the above—identified patent and that said Letters Patent is hereby corrected as shown below:

On the title page insert

-- [73] Assignee: TDK Corporation, Tokyo, JAPAN --.

Signed and Sealed this

Twenty-third Day of October 1984

[SEAL]

Attest:

GERALD J. MOSSINGHOFF

Attesting Officer     Commissioner of Patents and Trademarks